US 6,603,603 B2

(12) United States Patent
Obama

(10) Patent No.: US 6,603,603 B2
(45) Date of Patent: Aug. 5, 2003

(54) REAL IMAGE VIEWFINDER OPTICAL SYSTEM

(75) Inventor: Akihiko Obama, Sakura (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/193,265

(22) Filed: Jul. 12, 2002

(65) Prior Publication Data

US 2003/0002150 A1 Jan. 2, 2003

Related U.S. Application Data

(63) Continuation of application No. 09/714,536, filed on Nov. 17, 2000, now abandoned.

(30) Foreign Application Priority Data

Nov. 18, 1999 (JP) .......................................... 11-328781
Oct. 19, 2000 (JP) ....................................... 2000-319435

(51) Int. Cl.$^7$ ............................................. G02B 23/00
(52) U.S. Cl. ..................... 359/431; 359/432; 359/831
(58) Field of Search ......................... 359/362, 643, 359/420–433, 831–837; 395/373–386

(56) References Cited

U.S. PATENT DOCUMENTS

| 5,678,080 A | | 10/1997 | Miyamoto | 396/383 |
| 5,893,653 A | * | 4/1999 | Abe | 396/384 |
| 5,946,147 A | | 8/1999 | Tanaka et al. | 396/831 |
| 6,122,080 A | * | 9/2000 | Ogata | 359/15 |
| 6,154,314 A | | 11/2000 | Takahashi | 359/432 |
| 6,262,852 B1 | * | 7/2001 | Takahashi | 359/643 |

FOREIGN PATENT DOCUMENTS

| JP | 4-63313 | 2/1992 |
| JP | 8-179400 | 7/1996 |
| JP | 8-304880 | 11/1996 |
| JP | 10-282422 | 10/1998 |

* cited by examiner

Primary Examiner—Thong Nguyen
(74) Attorney, Agent, or Firm—Miles & Stockbridge P.C.

(57) ABSTRACT

The object of the present invention is to provide a real image viewfinder optical system with high optical performance and compactness, whose dimension of a whole optical system including an image inverter optical system is small in the thickness direction, and whose dimension to an object side of an eyepiece lens system is small in the thickness direction. A real image viewfinder optical system comprises, in order from an object side, an objective lens system having a positive refractive power as a whole, an eyepiece lens system for observing a real image formed by the objective lens system and having a positive refractive power, and an image inverter optical system for erecting the image to be observed and arranged to an exit pupil side of a lens located to the most object side of the objective lens system and also to the object side of a lens located to the most exit pupil side of the eyepiece lens system. Conditional expressions are satisfied.

4 Claims, 3 Drawing Sheets

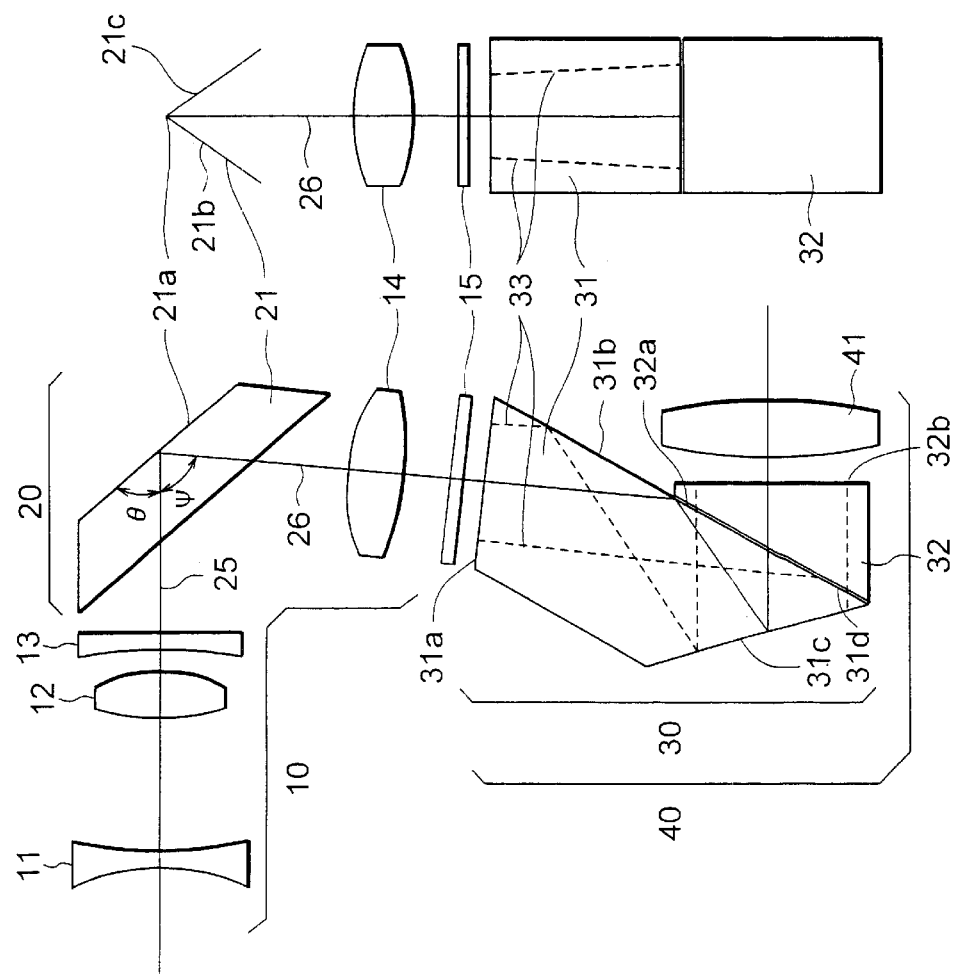
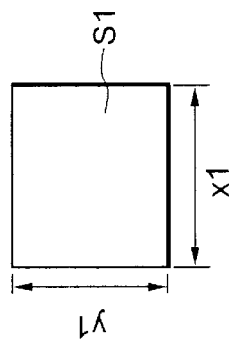
FIG. 1C
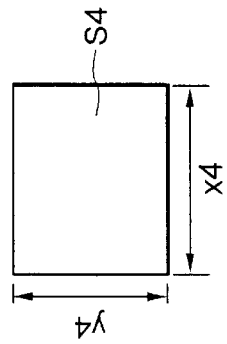
FIG. 1D

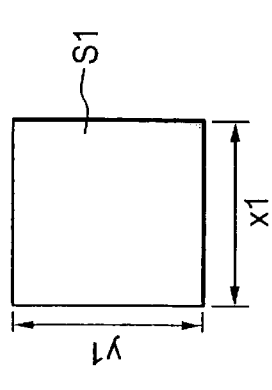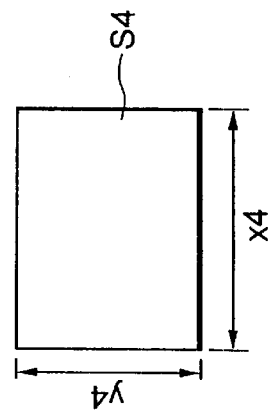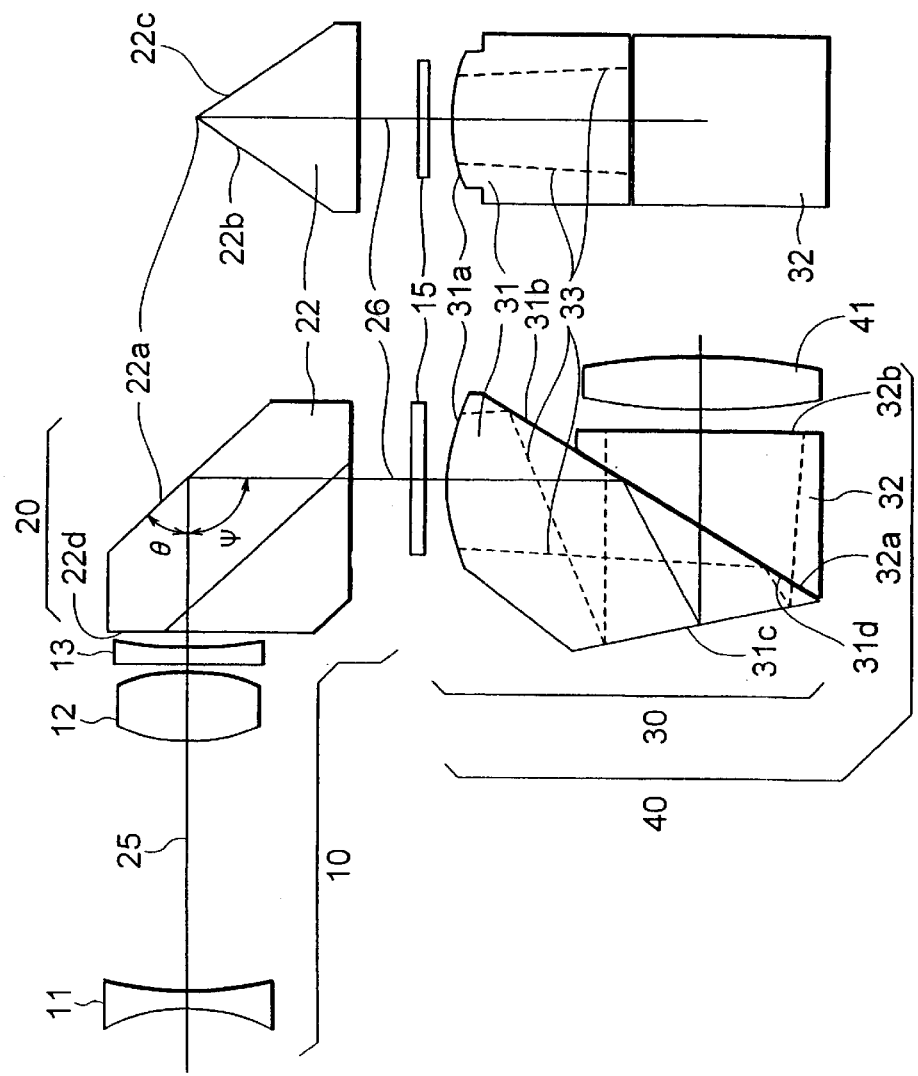

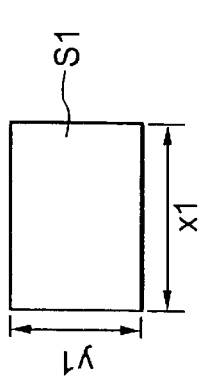
FIG. 3C
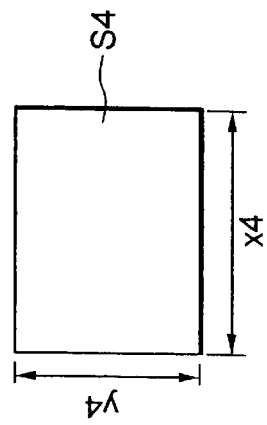
FIG. 3D
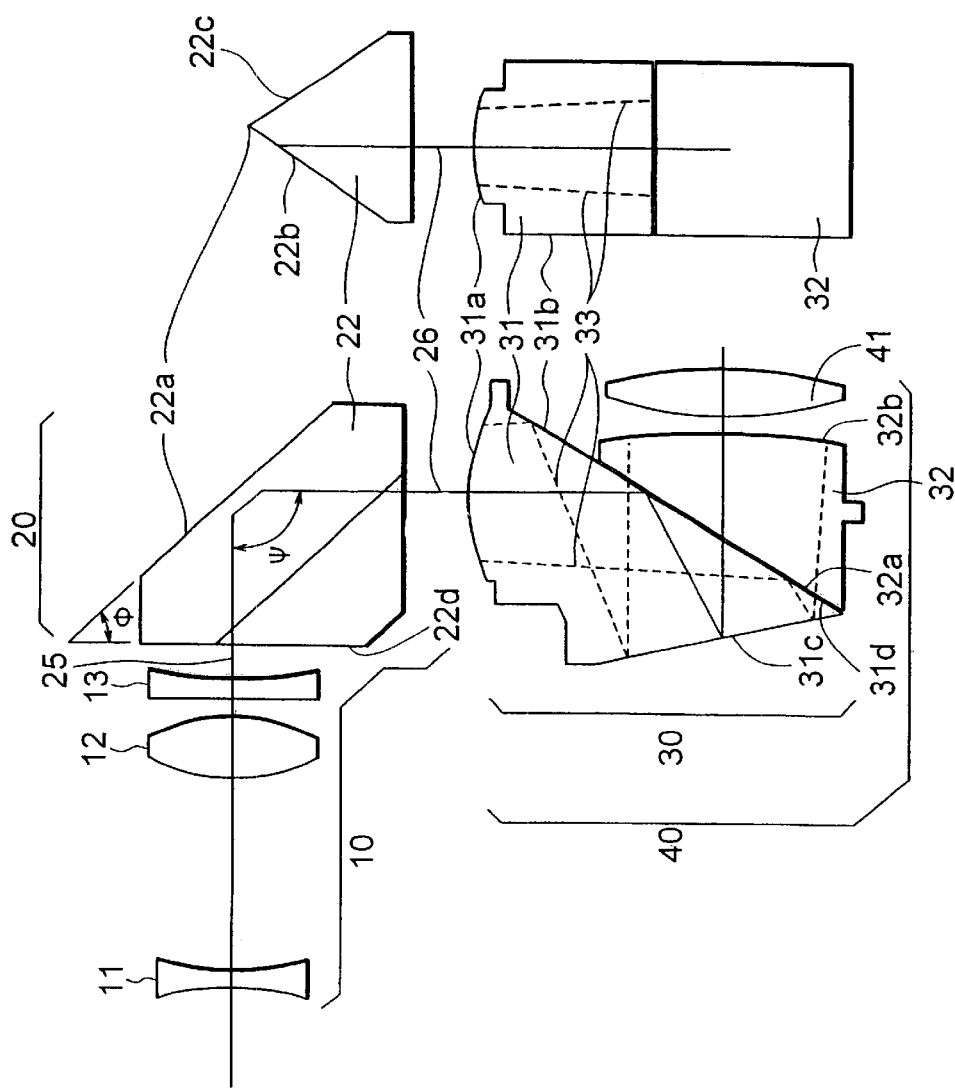
FIG. 3A
FIG. 3B

REAL IMAGE VIEWFINDER OPTICAL SYSTEM

CROSS REFERENCE TO RELATED APPLICATION

This application is a continuation of U.S. application Ser. No. 09/714,536 filed Nov. 17, 2000, now abandoned.

INCORPORATION BY REFERENCE

The disclosures of the following priority applications are herein incorporated by reference:

Japanese Patent Application No. 11-328781 filed Nov. 18, 1999.

Japanese Patent Application No. 2000-319435 filed Oct. 19, 2000.

BACKGROUND OF THE INVENTION

1. Field of the Invention

The present invention relates to a real image viewfinder optical system for a camera, a digital still camera, and the like.

2. Description of Related Art

A real image viewfinder optical system includes an objective lens system having a positive refractive power as a whole, an eyepiece lens system having a positive refractive power for observing a real image formed by the objective lens system, and an image inverter optical system for erecting an inverted image formed by the objective lens system. In a compact type real image viewfinder used for a camera and the like, a reflection type image inverter optical system is commonly used.

In the reflection type image inverter optical system, there are a Porro type for inverting an image by reflection elements, such as a single or a plurality of Porro prisms having more than four reflection surfaces and a roof type for inverting an image by reflection elements, such as a roof prism having roof reflection surfaces.

Coordinates crossing at right angles with each other in a plane perpendicular to an optical axis of an incident light into a viewfinder optical system or a plane perpendicular to an optical axis of a light reflected by each reflection surface are to be called a vertical direction and a horizontal direction, respectively. A direction parallel to only the optical axis of the incident light into the viewfinder optical system is to be called a thickness direction. A direction in the horizontal direction relative to the optical axis of the incident light into the viewfinder optical system is to be called a width direction.

In the Porro type, the reflection type image inverter optical system is liable to become large in the horizontal direction when used for inverting an image in the horizontal direction, and in the vertical direction when used for inverting an image in the vertical direction. Therefore, an optical system according to the Porro type is liable to become large, so that it is not suitable for miniaturization.

Then, in a roof type, a projected direction of a roof ridgeline of a roof type reflection element on a plane perpendicular to the optical axis of the incident light or a plane perpendicular to the optical axis of the light reflected by each reflection surface is defined to be a horizontal direction. A direction perpendicular to the horizontal direction is defined to be a vertical direction. In this case, since an image inversion in vertical direction is performed on the roof surfaces composing the roof ridgeline, the dimension of the optical element in vertical direction can be small in comparison with the Porro type. Therefore, the roof type is advantageous for miniaturization relative to the Porro type.

There have been known an optical system using a pentagonal prism and an optical element using a combination of two triangle or trapezoidal prisms for performing an image inversion in horizontal direction by using an optical system of a roof type. Hereinafter the former is called a reflection type image inverter optical system using pentagonal and roof prisms and the latter is called a reflection type image inverter optical system using triangular and roof prisms.

As for reflection type image inverter optical system using pentagonal and roof prisms, there have been optical systems proposed in Japanese Patent Application Laid-Open Nos. 4-63313 and 8-304880. In an optical system disclosed by Japanese Patent Application Laid-Open No. 4-63313, an optical axis of an incident light to a roof mirror makes an angle of approximately 45° with a roof ridgeline. Accordingly, the roof mirror reflects the incident light in the width direction making an angle of approximately 90° with the optical axis of the exit light. The exit light is incident to a pentagonal prism, and is led to an eyepiece via two reflections in the pentagonal prism. In an optical system disclosed by Japanese Patent Application Laid-Open No. 8-304880, an optical axis of an incident light to a roof prism makes an angle of more than 45° with a roof ridgeline. Accordingly, the roof prism reflects the incident light in the width direction making an angle of less than 90° with the optical axis of the exit light. The exit light is incident to a pentagonal prism, and is led to an eyepiece via two reflections in the pentagonal prism.

On the other hand, as for reflection type image inverter optical system using triangular and roof prisms, there have been optical systems proposed in Japanese Patent Application Laid-Open No. 8-179400 and the like. In an optical system disclosed by Japanese Patent Application Laid-Open No. 8-179400, an optical axis of an incident light to a roof prism makes an angle of less than 45° with a roof ridgeline. Accordingly, the roof prism reflects the incident light in the width direction making an angle of more than 90° with the optical axis of the exit light. The exit light is incident to a first triangular prism, to a second triangular prism via two reflections in the first triangular prism, and is led to an eyepiece.

However, in the optical system disclosed by Japanese Patent Application Laid-Open No. 4-63313, since the roof mirror reflects the incident light in the width direction making an angle of approximately 90° with the optical axis of the exit light, the pentagonal prism is arranged at right besides the roof mirror. Accordingly, the eyepiece is located to an exit pupil side of the pentagonal prism, so that it is difficult to reduce the dimension of the whole optical system of the real image viewfinder optical system including the image inverter optical system in the thickness direction.

Moreover, in the optical system disclosed by Japanese Patent Application Laid-Open No. No. 8-304880, since the roof prism reflects the incident light in the width direction making an angle of less than 90° with the optical axis of the exit light, the pentagonal prism is arranged to the object side relative to the roof prism. Accordingly, the position of the eyepiece in the thickness direction can be the same as that of the roof prism, so that it is possible to reduce the dimension of the whole optical system of the real image viewfinder optical system including the image inverter optical system in the thickness direction. However, in the object side of the eyepiece, the pentagonal prism protrudes to the object side, so that it is difficult to reduce the dimension in the thickness direction to the object side of the eyepiece.

Furthermore, in an optical system disclosed by Japanese Patent Application Laid-Open No. 8-179400, since the roof prism reflects the incident light in the width direction making an angle of more than 90° with the optical axis of the exit light, the first and second triangular prisms are located to the exit pupil side relative to the roof prism. Accordingly, the eyepiece is arranged to the exit pupil side of the second triangular prism, so that it is difficult to reduce the dimension of the whole optical system of the real image viewfinder optical system including the image inverter optical system in the thickness direction.

SUMMARY OF THE INVENTION

The present invention is made in view of the aforementioned problems and has an object to provide a real image viewfinder optical system with high optical performance and compactness, whose dimension of whole optical system including an image inverter optical system is small in the thickness direction, and whose dimension to an object side of an eyepiece lens system is small in the thickness direction.

In order to solve the aforementioned problems, the present invention provides a real image viewfinder optical system comprising, in order from an object side, an objective lens system having a positive refractive power as a whole, an eyepiece lens system that observes a real image formed by the objective lens system and has a positive refractive power, and wherein said real image viewfinder optical system has an image inverter optical system that erects the image to be observed and is arranged to an exit pupil side of a lens located to the most object side of the objective lens system and also to the object side of a lens located to the most exit pupil side of the eyepiece lens system, wherein the image inverter optical system includes, in order from the object side along an optical axis of the viewfinder optical system, a roof reflection element that reflects an incident light from the object side, a first prism having a first reflection surface that reflects an exit light from the roof reflection element to the object side and a second reflection surface that reflects an exit light from the first reflection surface to the exit pupil side, and a second prism having a third transmitting surface approximately parallel to the first reflection surface, wherein the first prism includes a first transmitting surface that intersects the optical axis of the exit light from the roof reflection element approximately perpendicularly and a second transmitting surface that transmits an exit light from the second reflection surface in the same plane as the first reflection surface, wherein the second prism includes a fourth transmitting surface that intersects an optical axis of an exit light from the second prism approximately perpendicularly, and wherein the following conditional expression (1) is satisfied:

$$45°\leq\theta<50° \quad (1)$$

where θ denotes an angle (unit: degree) between an optical axis of the incident light to the roof reflection element and a roof ridgeline of the roof reflection element.

The refractive index and the dispersion of the first prism are preferably the same as those of the second prism.

In this situation, it is preferable to satisfy the following conditional expression (2):

$$S1/S4<1 \quad (2)$$

where S1 denotes a projected area of the first transmitting surface to a plane perpendicular to an optical axis of the incident light to the first prism and including an intersection of the first transmitting surface and the optical axis, and S4 denotes a projected area of the fourth transmitting surface to a plane perpendicular to the optical axis of the exit light from the second prism and including an intersection of the fourth transmitting surface and the optical axis.

According to another aspect of the present invention, a real image viewfinder optical system comprises, in order from an object side, an objective lens system having a positive refractive power as a whole, an eyepiece lens system that observes a real image formed by the objective lens system and has a positive refractive power, and an image inverter optical system that erects the image to be observed and is arranged to an exit pupil side of a lens located to the most object side of the objective lens system and also to the object side of a lens located to the most exit pupil side of the eyepiece lens system, wherein the image inverter optical system includes, in order from the object side along an optical axis of the viewfinder optical system, a roof reflection element that reflects an incident light from the object side, a first prism having a first reflection surface that reflects an exit light from the roof reflection element to the object side and a second reflection surface that reflects an exit light from the first reflection surface to the exit pupil side, and a second prism having a third transmitting surface approximately parallel to the first reflection surface, wherein an optical axis of the incident light to the roof reflection element makes a skew relation to the roof ridgeline, wherein the first prism includes a first transmitting surface that intersects an optical axis of the exit light from the roof reflection element approximately perpendicularly and a second transmitting surface that transmits an exit light from the second reflection surface in the same plane as the first reflection surface, wherein the second prism includes a fourth transmitting surface that intersects an optical axis of an exit light from the second prism approximately perpendicularly, and wherein the following conditional expression (3) is satisfied:

$$40°<\phi\leq45° \quad (3)$$

where φ denotes an angle (unit: degree) between a plane perpendicular to the optical axis of the incident light to the roof reflection element and the roof ridgeline of the roof reflection element.

The refractive index and the dispersion of the first prism are preferably the same as those of the second prism.

In this situation, it is preferable to satisfy the following conditional expression (4):

$$S1/S4<1 \quad (4)$$

where S1 denotes a projected area of the first transmitting surface to a plane perpendicular to the optical axis of the incident light to the first prism and including an intersection of the first transmitting surface and the optical axis, and S4 denotes a projected area of the fourth transmitting surface to a plane perpendicular to the optical axis of the exit light from the second prism and including an intersection of the fourth transmitting surface and the optical axis.

BRIEF DESCRIPTION OF THE DRAWINGS

FIGS. 1A through 1D are diagrams showing an outline of a real image viewfinder optical system according to a first example of the present invention.

FIGS. 2A through 2D are diagrams showing an outline of a real image viewfinder optical system according to a second example of the present invention.

FIGS. 3A through 3D are diagrams showing an outline of a real image viewfinder optical system according to a third example of the present invention.

DESCRIPTION OF THE PREFERRED EMBODIMENTS

A real image viewfinder optical system according to an example of the present invention will be described below. In the following explanation, a direction parallel to only an optical axis 25 of an incident light to a viewfinder optical system is defined to be a thickness direction. A direction of a roof ridgeline of a roof reflection element projected on a plane perpendicular to the optical axis 25 of the incident light and a plane perpendicular to an optical axis (26 or the like) of a reflected light by each reflection surface is defined to be a horizontal direction and a direction perpendicular to the horizontal direction is defined to be a vertical direction.

In FIGS. 1A, 2A, and 3A, a direction in a plane perpendicular to each optical axis and also in the plane of the drawing or parallel to the plane of the drawing is the horizontal direction, and a direction perpendicular to the plane of the drawing is the vertical direction. In the plane of the drawing, the thickness direction is a direction of the optical axis of the incident light to the viewfinder optical system and the width direction is a direction perpendicular to the thickness direction.

An optical system of a real image viewfinder includes, in order from an object side, an objective lens system 10 having a positive refractive power as a whole, and an eyepiece lens system 40 for observing a real image formed by the objective lens system. In this construction, the observing image becomes an inverted image with respect to both vertical and horizontal directions, so that it is general that an image inverter optical system is included in order to erect the inverted image.

Moreover, it is preferable that the image inverter optical system is arranged to an exit pupil side of a lens located to the most object side of the objective lens system 10 and also to the object side of a lens located to the most exit pupil side of the eyepiece lens system 40. When the image inverter optical system is arranged to the object side of the lens located to the most object side of the objective lens system 10, the objective lens system 10 is arranged in the width direction, so that the dimension in the width direction of the real image viewfinder optical system as a whole becomes large. As a result, it cannot be made compact. Accordingly, an object of the present invention cannot be accomplished.

On the other hand, when the image inverter optical system is arranged to the exit pupil side of the lens located to the most exit pupil side of the eyepiece lens system 40, the eyepiece lens system 40 is arranged in the width direction, so that the dimension in the width direction of the real image viewfinder optical system as a whole becomes large. As a result, it cannot be made compact. Accordingly, an object of the present invention cannot be accomplished.

By the way, in the present invention, an exit pupil means the exit pupil of the eyepiece lens system, and is located at the eyepoint.

Then, the construction and an effect of the image inverter optical system will be described with reference to FIGS. 1A and 1B.

The image inverter optical system includes, in order from the object side along the optical axis of the real image viewfinder optical system, a roof reflection element 20 that reflects an incident light from the object side, a first prism 31 having a first reflection surface 31b that reflects an exit light from the roof reflection element 20 to the object side and a second reflection surface 31c that reflects an exit light from the first reflection surface 31b to the exit pupil side, and a second prism 32 having a third transmitting surface 32a approximately parallel to the first reflection surface 31b.

The roof reflection element 20 is arranged such that a projection of a roof ridgeline 21a onto a plane perpendicular to the optical axis 25 of the incident light or a plane perpendicular to an optical axis (26 or the like) of a reflected light by each reflection surface is in the horizontal direction, and performs an image inversion in the vertical direction by roof surfaces 21b and 21c putting the roof ridgeline 21a in between. In the construction shown in FIG. 1A, although the roof reflection element 20 is constructed by a roof mirror 21 having mirrors composing roof surfaces, the present invention is not limited to the example, and it is possible to construct by a roof prism using rear-surface total reflections. On the other hand, an image inversion in the horizontal direction is performed by the first prism 31 having the first reflection surface 31b and the second reflection surface 31c. Therefore the image inversion is performed by the effect of these four reflection surfaces.

The first prism 31 includes a first transmitting surface 31a that intersects an optical axis 26 of the exit light from the roof reflection element 20 approximately perpendicularly and a second transmitting surface 31d that transmits an exit light from the second reflection surface 31c in the same plane as the first reflection surface 31b. By making the first reflection surface 31b and the second transmitting surface 31d to be in the same plane, the plane performs two functions, a reflection and a transmission, relative to the effective light flux, so that the real image viewfinder optical system can be made compact.

Here, since the exit light from the first prism 31 comes out from the second transmitting surface 31d not being perpendicular to the optical axis of the exit light, the optical path in the first prism 31 is different in the horizontal direction. In order to correct the difference in the optical path, the second prism 32 includes the third transmitting surface 32a approximately parallel to the second transmitting surface 31d of the first prism 31 and a fourth transmitting surface 32b intersecting an optical axis of an exit light from the second prism 32 approximately perpendicularly. The real image viewfinder optical system capable of observing an erected image can be realized by the construction described above.

Then, conditional expressions according to the present invention will be described.

It is preferable for the present invention to satisfy the following conditional expression (1):

$$45° \leq \theta < 50° \tag{1}$$

where θ denotes an angle (unit: degree) between an optical axis of the incident light 25 to the roof reflection element 20 and a roof ridgeline 21a of the roof reflection element.

Conditional expression (1) defines an appropriate range of θ in order to make a dimension of a real image viewfinder optical system including an image inverter optical system as a whole smaller in the thickness direction and also to make a dimension to the object side of the eyepiece 41 smaller in the thickness direction.

When the angle θ between the optical axis of the incident light 25 to the roof reflection element 20 and a roof ridgeline 21a of the roof reflection element 20 is set, the angle Ψ (unit: degree) between the optical axis 25 of the incident light to the roof reflection element 20 and the optical axis 26 of the exit light from the roof reflection element 20 is necessarily set in accordance with the reflection law. The relation is expressed by the following expression (5):

$$105 = 180° - 2\theta \qquad (5).$$

When θ falls below the lower limit of conditional expression (1), in other words, when Ψ exceeds 90°, the exit light 26 from the roof reflection element 20 comes out away from the object side relative to the roof reflection element 20. Accordingly, the first prism 31 and the second prism 32 are arranged relatively to the exit pupil side of the roof reflection element 20, so that the eyepiece 41 is arranged to the exit pupil side of the second prism 32. As a result, the real image viewfinder optical system as a whole becomes large in the thickness direction, so that the object of the present invention cannot be accomplished.

On the other hand, when θ exceeds the upper limit of conditional expression (1), in other words, when Ψ falls below 80°, the exit light 26 from the roof reflection element 20 comes out near to the object side relative to the roof reflection element 20. Since an angle between the incident light to the first prism 31 and the first reflection surface 31b becomes small, the area of the first reflection surface 31b becomes excessively large in the direction projected the incident light onto the first reflection surface 31b in order to maintain effective light flux. As a result, the dimension of the first prism 31 becomes large in the width direction, so that the object of the present invention for providing a compact viewfinder optical system cannot be accomplished. Moreover, in accordance with the relative expansion of the first reflection surface 31b in the width direction, the second reflection surface 31c is to be located largely to the object side relative to the roof reflection element 20. As a result, a dimension of the viewfinder optical system to the object side of the eyepiece 41 becomes large in the thickness direction, so that the object of the present invention cannot be accomplished.

Furthermore, in the present invention, it is preferable to satisfy following conditional expression (2):

$$S1/S4 < 1 \qquad (2)$$

where S1 denotes a projected area of the first transmitting surface 31a to a plane perpendicular to an optical axis of the incident light and including an intersection of the first transmitting surface 31a and the optical axis, and S4 denotes a projected area of the fourth transmitting surface 32b to a plane perpendicular to the optical axis of the exit light from the second prism 32 and including an intersection of the fourth transmitting surface 32b and the optical axis.

Conditional expression (2) is for realizing miniaturization of a real image viewfinder optical system as a whole and for providing an optical system with fewer ghost images. In FIG. 1A, effective light flux 33 shown by broken lines passes or reflects in the first and second prisms. As apparent from the figure, the diameter of the effective light flux 33 in the first transmitting surface 31a is smaller than that in the fourth transmitting surface 32b. This is for increasing qualities of the optical system by making an eye relief longer on observing peripheral images.

When the ratio of S1/S4 exceeds the upper limit of conditional equation (2), in other words, when S1 is bigger than S4, the projection area S4 of the fourth transmitting surface 32b is larger or smaller than the effective light flux. In the former case, the projected area S1 of the first transmitting surface 31a becomes excessively large relative to the effective light flux. Accordingly, the dimension of the first prism 31 itself becomes too large, so that the object of compactness cannot be accomplished. On the other hand, in the latter case, the first prism 31 can be made to be a moderate dimension. However, since the projected area S4 of the fourth transmitting surface 32b becomes smaller than the effective light flux, a light passing through the most peripheral areas hits on surrounding walls of the second prism 32, so that it causes ghost images produced by inner surface reflection of the prism. As a result, the production of these ghost images deteriorates imaging quality of the viewfinder optical system, so that the object of high quality cannot be accomplished. Therefore, in either case, the objects of the present invention cannot be accomplished.

Furthermore, in order to obtain a high quality viewfinder optical system, the refractive index and the dispersion of the first prism 31 are preferably approximately the same as those of the second prism 32.

As described above, the second prism 32 corrects the optical path difference in the horizontal direction in the first prism 31. When the refractive index of the first prism 31 is not approximately the same as that of the second prism 32, the optical path difference of the first prism 31 in the horizontal direction is different from that of the second prism 32, so that these differences cannot be canceled out. Accordingly, the optical path from the first transmitting surface 31a to the fourth transmitting surface 32b differs in the horizontal direction, so that dioptral difference is produced at left and right of a visual field. As a result, a high quality viewfinder optical system cannot be provided.

Further, when the dispersion of the first prism 31 is not approximately the same as that of the second prism 32, the optical path difference of the first prism 31 in the horizontal direction in each wavelength is different from that of the second prism 32, so that these differences cannot be canceled out. Accordingly, the optical path from the first transmitting surface 31a to the fourth transmitting surface 32b differs in the horizontal direction in each wavelength, so that dioptral difference in each wavelength at left and right of a visual field produces color smear. As a result, a high quality viewfinder optical system cannot be provided.

Then, a real image viewfinder optical system according to the present invention will be explained from another point of view. By the way, a coordinate system used here is defined as the same as the one described in the aforementioned real image viewfinder optical system. Moreover, the constructions of the real image viewfinder optical system and the arrangement of the image inverter optical system are to be the same as described above.

The construction and function of the image inverter optical system is explained with reference to FIGS. 3A and 3B.

The image inverter optical system includes, in order from the object side along the optical axis of the real image viewfinder optical system, a roof reflection element 20 that reflects an incident light from the object side, a first prism 31 having a first reflection surface 31b that reflects an exit light from the roof reflection element 20 to the object side and a second reflection surface 31c that reflects an exit light from the first reflection surface 31b to the exit pupil side, and a second prism 32 having a third transmitting surface 32a approximately parallel to the first reflection surface 31b.

The roof reflection element 20 having a roof ridgeline 22a in the horizontal direction performs an image inversion in the vertical direction by roof surfaces 22b and 22c putting the roof ridgeline 22a in between. In the construction shown in FIG. 3A, although the roof reflection element 20 is constructed by a prism having roof surfaces for rear-surface total reflection, that is a roof prism 22, the present invention is not limited to the example, and it is possible to construct by a roof mirror. On the other hand, an image inversion in the horizontal direction is performed by the first prism 31 having the first reflection surface 31b and the second reflection surface 31c. Therefore the image inversion is performed by the effect of these four reflection surfaces.

The optical axis 25 of the incident light to the roof reflection element 20 makes a skew relation to the roof ridgeline 22a. On the other hand, if the incident optical axis 25 intersects the roof ridgeline 22a, a light passing approximately through the center of field while observing the viewfinder optical system, which is substantially the optical axis, intersects the roof ridgeline 22a. On observing a viewfinder optical system, optical performance of a central part of an observing image psychologically affects the whole appearance of an image formed by the viewfinder optical system. Accordingly, to make optical performance of the central part an observed image high is to make optical performance of the whole viewfinder optical system high. However, if the roof ridgeline 22a of the roof prism 22 cannot be manufactured with sufficient accuracy, the observed image is blurred in the central part, so that a high quality viewfinder optical system cannot be provided. Accordingly, by making the incident optical axis 25 a skew relation to the roof ridgeline 22a, the effect of manufacturing accuracy of the roof ridgeline 22a can be moved from the central part of the observing image, so that a high quality viewfinder optical system can be provided.

The first prism 31 includes a first transmitting surface 31a that intersects an optical axis 26 of the exit light from the roof reflection element 20 approximately perpendicularly and a second transmitting surface 31d that transmits an exit light from the second reflection surface 31c in the same plane as the first reflection surface 31b. By making the first reflection surface 31b and the second transmitting surface 31d to be in the same plane, the plane performs two functions, a reflection and a transmission, relative to the effective light flux, so that the real image viewfinder optical system can be made compact. However, since the exit light from the first prism 31 comes out from the second transmitting surface 31d not being perpendicular to the optical axis of the exit light, the optical path in the first prism 31 is different in the horizontal direction.

The second prism 32 includes the third transmitting surface 32a approximately parallel to the second transmitting surface 31d of the first prism 31 and a fourth transmitting surface 32b approximately perpendicular to the exit light from the second prism 32. The optical path being different in the horizontal direction can be corrected by arranging the second prism 32.

By employing the above mentioned construction, a real image viewfinder optical system capable of observing a high quality erected image not seriously affected with the accuracy of the roof ridgeline 22a can be realized.

Then, conditional expressions according to the present invention are going to be explained.

It is preferable for the present invention to satisfy the following conditional expression (3):

$$40°<\phi \leq 45° \tag{3}$$

where $\phi$ denotes an angle (unit: degree) between a plane perpendicular to the optical axis 25 of the incident light to the roof reflection element 20 and the roof ridgeline 22a of the roof reflection element 20.

Conditional expression (3) defines an appropriate range of the angle between a plane (for example, 22d in FIG. 3A) perpendicular to the optical axis 25 of the incident light to the roof reflection element 20 and the roof ridgeline 22a of the roof reflection element 20 in order to reduce a dimension of a real image viewfinder optical system including an image inverter optical system in the thickness direction and a dimension of the viewfinder optical system to the object side of an eyepiece 41 in the thickness direction.

When the angle $\phi$ between a plane perpendicular to the optical axis 25 of the incident light to the roof reflection element 20 and a roof ridgeline 22a of the roof reflection element 20 is set, the angle $\Psi$ (unit: degree) is necessarily set in accordance with the geometrical relation and the reflection, where the angle $\Psi$ (unit: degree) is an angle between projections of the optical axes 25 and 26 being a skew relation with each other onto a plane (which is called a projective plane) parallel to both axes 25 and 26. This is shown, for example, in FIG. 3A. The relation between $\phi$ and $\Psi$ is shown in following expression (6):

$$\Psi=2\phi \tag{6}$$

When the value $\phi$ exceeds the upper limit of conditional expression (3), in other words, when $\Psi$ exceeds 90°, the exit light 26 from the roof reflection element 20 comes out away from the object side relative to the roof reflection element 20. Therefore, the first prism 31 and the second prism 32 are located relatively to the exit pupil side of the roof reflection element 20, and the eyepiece 41 is located further to the exit pupil side of the second prism 32. As a result, a dimension of the real image viewfinder optical system becomes large in the thickness direction, so that an object according to the present invention cannot be accomplished.

On the other hand, when the value $\phi$ falls below the lower limit of conditional expression (3), in other words, when $\Psi$ is smaller than 80°, the exit light 26 from the roof reflection element 20 comes out to the object side relative to the roof reflection element 20. However, since an angle between the incident light to the first prism 31 and the first reflection surface 31b becomes small, the area of the first reflection surface 31b becomes excessively large in the direction of the incident light projected to the first reflecting surface 31b in order to maintain an effective diameter of the light. Accordingly, a dimension of the first prism 31 becomes large in the width direction, so that the object of the present invention for providing a compact viewfinder optical system cannot be accomplished. Moreover, in accordance with expansion of the first reflection surface 31b in the width direction, the second reflection surface 31c is located largely to the object side relative to the roof reflection element 20. As a result, a dimension to the object side of the eyepiece lens system 41 becomes large in the thickness direction, so that the object according to the present invention cannot be accomplished.

Furthermore, it is preferable for the present invention to satisfy the following conditional expression (4):

$$S1/S4<1 \tag{4}$$

Conditional expression (4) defines an appropriate range of a ratio of areas for providing a real image viewfinder optical system that is compact and has less ghost images. In FIG. 3A, an effective light flux 33 is attached to the first and second prisms. It is understood from the drawing that a dimension (size) of the effective light flux 33 at the first transmitting surface 31a is smaller than that at the fourth transmitting surface 32b. This is for the sake of improving optical quality by making an eye relief longer while observing peripheral images.

When the ratio exceeds the upper limit of conditional expression (4), in other words, when S1 is larger than S4, the following two cases can be conceivable. Namely, the projected area S4 of the fourth transmitting surface 32b is larger or smaller than the effective light flux. In the former case, a projected area of the first transmitting surface 31a becomes excessively large relative to the effective light flux, so that the first prism 31 itself becomes too large and, as a result, compactness cannot be accomplished. In the latter case, the dimension of the first prism 31 can be made an appropriate size. However, the projection area S4 of the fourth transmitting surface 32b becomes smaller than the effective light flux, so that a light passing through periphery hits side walls of the second prism 32 and, as a result, it produces ghost images reflected from inside of the prism. The ghost images degrade the viewfinder optical system, so that high optical performance cannot be expected. Accordingly, in either case, an object according to the present invention cannot be accomplished.

Furthermore, in order to obtain a high quality viewfinder optical system, a refractive index and a dispersion of the first prism 31 are preferably the same as those of the second prism 32.

As described above, the second prism 32 corrects the optical path difference in the horizontal direction produced in the first prism 31. If the refractive index of the first prism 31 is not approximately the same as that of the second prism 32, the optical path difference in the horizontal direction produced in the first prism 31 becomes different from that produced in the second prism 32. Accordingly, the optical path from the first transmitting surface 31a to the fourth transmitting surface 32b becomes different in the horizontal direction, so that dioptral difference is produced at left and right of a visual field. As a result, a high quality viewfinder optical system cannot be provided.

Further, when the dispersion of the first prism 31 is not approximately the same as that of the second prism 32, the optical path difference of the first prism 31 in the horizontal direction in each wavelength is different from that of the second prism 32, so that these differences cannot be canceled out. Accordingly, the optical path from the first transmitting surface 31a to the fourth transmitting surface 32b differs in the horizontal direction in each wavelength, so that dioptral difference in each wavelength at left and right of a visual field produces color smear. As a result, a high quality viewfinder optical system cannot be provided.

Each example according to the present invention is going to be explained below.

FIRST EXAMPLE

FIGS. 1A through 1D are diagrams showing an outline of a real image viewfinder optical system according to a first example of the present invention. FIG. 1A is a top plan view of the first example observed from the vertical direction. FIG. 1B is a sectional view of the first example sectioned by a vertical plane including an optical axis 26 of the exit light from a roof reflection element 20 and observed from an eyepiece side. FIG. 1C is a drawing showing a projected area S1 of a first transmitting surface 31a onto a plane perpendicular to the optical axis and also including an intersection between the first transmitting surface 31a and the optical axis. FIG. 1D is a drawing showing a projected area S4 of a fourth transmitting surface 32b onto a plane perpendicular to the optical axis of an exit light from the fourth transmitting surface 32b and also including an intersection between the fourth transmitting surface 32b and the optical axis.

By the way, in FIG. 1A, a direction in a plane perpendicular to each optical axis and also in the plane of the drawing or parallel to the plane of the drawing is the horizontal direction, and a direction perpendicular to the plane of the drawing is the vertical direction. Moreover, in FIGS. 1C and 1D, a direction in the plane of the drawing and also denoted by an arrow x is the horizontal direction, and a direction denoted by an arrow y is the vertical direction. The definitions are the same as in FIGS. 2 and 3.

The real image viewfinder optical system includes, in order from an object side, an objective lens system 10 having a positive refractive power for forming a real image, and an eyepiece lens system 40 having a positive refractive power for observing the real image. The objective lens system 10 includes, in order from the object side along the optical axis of the real image viewfinder optical system, a first lens 11, a second lens 12, a third lens 13, a roof reflection mirror 21, and a fourth lens 14, and forms the real image of the object in the vicinity of a field plate 15. The eyepiece lens system 40 includes, in order from the object side along the optical axis of the real image viewfinder optical system, the field plate 15, a first prism 31, a second prism 32, and an eyepiece 41, and makes it possible to observe the real image formed by the objective lens system 10.

An image inverter optical system consists of the roof reflection element 20 composed of the roof reflection mirror 21 and the eyepiece-side prism system 30 composed of the first prism 31 and the second prism 32, and is arranged to an exit pupil side of the first lens 11 located to the most object side of the objective lens system 10 and also to the object side of the eyepiece 41 located to the most exit pupil side of the eyepiece lens system 40.

The roof reflection mirror 21 is arranged such that a projection of a roof ridgeline 21a onto a plane perpendicular to an optical axis 25 of the incident light or a plane perpendicular to an optical axis, (26 or the like) of a reflected light by each reflection surface is in the horizontal direction, and performs an image inversion in the vertical direction by roof surfaces 21b and 21c putting the roof ridgeline 21a in between. On the other hand, an image inversion in the horizontal direction is performed by a first reflection surface 31b and a second reflection surface 31c of the first prism 31.

Moreover, the first prism 31 has a first transmitting surface 31a that intersects the optical axis 26 of the exit light from the roof reflection mirror 21 approximately perpendicularly and a second transmitting surface 31d that transmits an exit light from the second reflection surface 31c in the same plane as the first reflection surface 31b.

The second prism 32 has a third transmitting surface 32a being approximately parallel to the second transmitting surface 31d of the first prism 31 and a fourth transmitting surface 32b intersecting an optical axis of an exit light from the second prism 32 approximately perpendicularly.

In this construction, a light from the object transmits through the first lens 11, the second lens 12, and the third lens 13, and is incident to the roof reflection mirror 21 and is reflected by the roof reflection surfaces 21b and 21c. Then, a real image of the object is formed once in the vicinity of the field plate 15 after passing through the fourth lens 14. Then, the light is incident to the first transmitting surface 31a of the first prism 31 and is reflected by the first reflection surface 31b and the second reflection surface 31c, and comes out from the second transmitting surface 31d. Then, an erected image is observed through the eyepiece 41 after transmitting through the third transmitting surface 32a and the fourth transmitting surface 32b of the second prism 32.

Furthermore, the materials used for the first prism 31 and those for the second prism 32 are the same one. Therefore, the refractive index and dispersion of the first prism 31 are the same as those of the second prism 32.

Various values of the example are shown in Table 1. In Table 1, θ (unit: degree) denotes an angle between the optical axis 25 of the incident light to the roof reflection element 20 and the roof ridgeline 21a, and Ψ (unit: degree) denotes an angle between the optical axis 25 of the incident light to the roof reflection element 20 and the optical axis 26 of the exit light from the roof reflection element 20. Moreover, x1 denotes a horizontal dimension of a projection of the first transmitting surface 31a onto a plane perpendicular to the optical axis including an intersection between the first transmitting surface 31a and the optical axis, y1 denotes a vertical dimension, and S1 denotes an area. Likewise, x4, y4, S4 denote a horizontal dimension, vertical dimension, and area of a projection of the fourth transmitting surface 32b onto a plane perpendicular to the optical axis of the light exit from the second prism 32 and including an intersection between the fourth transmitting surface 32b and the optical axis, respectively. By the way, since the first transmitting surface 31a and the fourth transmitting surface 32b are both planes, the area of them coincide with S1 and S4, respectively. Moreover, the unit for length such as x1, y1, x4, y4, and the like is mm, and the unit for area such as S1 and S4 is mm$^2$, and the same applies to the following examples.

TABLE 1

θ = 47.5°
Ψ = 85°
x1 = 9
y1 = 8
S1 = x1 × y1 = 72
x4 = 9.6
y4 = 8
S4 = x4 × y4 = 76.8
S1/S4 = 72/76.8 = 0.9375

By using the aforementioned construction according to the example, it is obvious that a dimension of the real image viewfinder optical system including the image inverter optical system is small in the thickness direction, and a dimension to the object side of the eyepiece is small in the thickness direction.

SECOND EXAMPLE

FIGS. 2A through 2D are diagrams showing an outline of a real image viewfinder optical system according to a second example of the present invention. FIG. 2A is a top plan view of the second example observed from the vertical direction. FIG. 2B is a sectional view of the second example sectioned by a vertical plane including an optical axis 26 of the exit light from a roof reflection element 20 and observed from an eyepiece side. FIG. 2C is a drawing showing a projected area S1 of a first transmitting surface 31a onto a plane perpendicular to the optical axis and also including an intersection between the first transmitting surface 31a and the optical axis. FIG. 2D is a drawing showing a projected area S4 of a fourth transmitting surface 32b onto a plane perpendicular to the optical axis of an exit light from the fourth transmitting surface 32b and also including an intersection between the fourth transmitting surface 32b and the optical axis.

The real image viewfinder optical system according to the second example includes, in order from an object side, an objective lens system 10 having a positive refractive power for forming a real image, and an eyepiece lens system 40 having a positive refractive power for observing the real image. The objective lens system 10 includes, in order from the object side along the optical axis of the real image viewfinder optical system, a first lens 11, a second lens 12, a third lens 13, and a roof prism 22, and forms the real image of the object in the vicinity of a field plate 15. The eyepiece lens system 40 includes, in order from the object side along the optical axis of the real image viewfinder optical system, the field plate 15, a first prism 31, a second prism 32, and an eyepiece 41, and makes it possible to observe the real image formed by the objective lens system 10.

An image inverter optical system consists of the roof reflection element 20 composed of the roof reflection prism 22 and the eyepiece-side prism system 30 composed of the first prism 31 and the second prism 32, and is arranged to an exit pupil side of the first lens 11 located to the most object side of the objective lens system 10 and also to the object side of the eyepiece 41 located to the most exit pupil side of the eyepiece lens system 40.

The roof reflection prism 22 is arranged such that a projection of a roof ridgeline 22a onto a plane perpendicular to an optical axis 25 of the incident light or a plane perpendicular to an optical axis (26 or the like) of a reflected light by each reflection surface is in the horizontal direction, and performs an image inversion in the vertical direction by roof surfaces 21b and 21c putting the roof ridgeline 22a in between. On the other hand, an image inversion in the horizontal direction is performed by a first reflection surface 31b and a second reflection surface 31c of the first prism 31.

Moreover, the first prism 31 has a first transmitting surface 31a that intersects the optical axis 26 of the exit light from the roof reflection prism 22 approximately perpendicularly and a second transmitting surface 31d that transmits an exit light from the second reflection surface 31c in the same plane as the first reflection surface 31b.

The second prism 32 has a third transmitting surface 32a being approximately parallel to the second transmitting surface 31d of the first prism 31 and a fourth transmitting surface 32b intersecting an optical axis of an exit light from the second prism 32 approximately perpendicularly.

In this construction, a light from the object transmits through the first lens 11, the second lens 12, and the third lens 13, is incident to the roof reflection prism 22 and is reflected by the roof reflection surfaces 22b and 22c. Then, a real image of the object is formed once in the vicinity of the field plate 15. Then, the light is incident to the first transmitting surface 31a of the first prism 31 and is reflected by the first reflection surface 31b and the second reflection surface 31c, and comes out from the second transmitting surface 31d. Then, an erected image is observed through the eyepiece 41 after transmitting through the third transmitting surface 32a and the fourth transmitting surface 32b of the second prism 32.

Furthermore, the materials used for the first prism 31 and those for the second prism 32 are the same one. Therefore, the refractive index and dispersion of the first prism 31 are the same as those of the second prism 32.

Various values of the second example are shown in Table 2. In Table 2, θ (unit: degree) denotes an angle between the optical axis 25 of the incident light to the roof reflection element 20 and the roof ridgeline 22a, and Ψ (unit: degree) denotes an angle between the optical axis 25 of the incident light to the roof reflection element 20 and the optical axis 26 of the exit light from the roof reflection element 20. Moreover, x1, y1, S1 denote a horizontal dimension, vertical dimension, and area of a projection of the first transmitting surface 31*a* onto a plane perpendicular to the optical axis including an intersection between the first transmitting surface 31*a* and the optical axis, respectively. Likewise, x4, y4, S4 denote a horizontal dimension, vertical dimension, and area of a projection of the fourth transmitting surface 32*b* onto a plane perpendicular to the optical axis of the light exit from the second prism 32 and including an intersection between the fourth transmitting surface 32*b* and the optical axis, respectively. By the way, since the fourth transmitting surface 32*b* is a plane, the area coincides with S4.

TABLE 2

| |
|---|
| θ = 45° |
| ψ = 90° |
| x1 = 9 |
| y1 = 9 |
| S1 = x1 × y1 = 81 |
| x4 = 12 |
| y4 = 9 |
| S4 = x4 × y4 = 108 |
| S1/S4 = 81/108 = 0.75 |

By using the aforementioned construction according to the example, it is obvious that a dimension of the real image viewfinder optical system including the image inverter optical system is small in the thickness direction, and a dimension to the object side of the eyepiece is small in the thickness direction.

THIRD EXAMPLE

FIGS. 3A through 3D are diagrams showing an outline of a real image viewfinder optical system according to a third example of the present invention. FIG. 3A is a top plan view of the third example observed from the vertical direction. FIG. 3B is a sectional view of the third example sectioned by a vertical plane including an optical axis 26 of the exit light from a roof reflection element 20 and observed from an eyepiece side. FIG. 3C is a drawing showing a projected area S1 of a first transmitting surface 31*a* onto a plane perpendicular to the optical axis and also including an intersection between the first transmitting surface 31*a* and the optical axis. FIG. 3D is a drawing showing a projected area S4 of a fourth transmitting surface 32*b* onto a plane perpendicular to the optical axis of an exit light from the fourth transmitting surface 32*b* and also including an intersection between the fourth transmitting surface 32*b* and the optical axis.

The real image viewfinder optical system according to the third example includes, in order from an object side, an objective lens system 10 having a positive refractive power for forming a real image, and an eyepiece lens system 40 having a positive refractive power for observing the real image. The objective lens system 10 includes, in order from the object side along the optical axis of the real image viewfinder optical system, a first lens 11, a second lens 12, a third lens 13, and a roof prism 22, and forms the real image of the object in the vicinity of a first transmitting surface 31*a* of a first prism 31. The eyepiece lens system 40 includes, in order from the object side along the optical axis of the real image viewfinder optical system, the first prism 31, a second prism 32, and an eyepiece 41, and makes it possible to observe the real image formed by the objective lens system 10.

An image inverter optical system consists of the roof reflection element 20 composed of the roof reflection prism 22 and the eyepiece-side prism system 30 composed of the first prism 31 and the second prism 32, and is arranged to an exit pupil side of the first lens 11 located to the most object side of the objective lens system 10 and also to the object side of the eyepiece 41 located to the most exit pupil side of the eyepiece lens system 40.

The roof reflection prism 22 is arranged such that a projection of a roof ridgeline 22*a* onto a plane perpendicular to an optical axis 25 of the incident light or a plane perpendicular to an optical axis (26 or the like) of a reflected light by each reflection surface is in the horizontal direction, and performs an image inversion in the vertical direction by roof surfaces 21*b* and 21*c* putting the roof ridgeline 22*a* in between. On the other hand, an image inversion in the horizontal direction is performed by a first reflection surface 31*b* and a second reflection surface 31*c* of the first prism 31.

Further, the optical axis 25 of a light incident to the roof reflection prism 22 is made to be a skew relation to the roof ridgeline 22*a*.

Moreover, the first prism 31 has a first transmitting surface 31*a* that intersects the optical axis 26 of the exit light from the roof reflection prism 22 approximately perpendicularly and a second transmitting surface 31*d* that transmits an exit light from the second reflection surface 31*c* in the same plane as the first reflection surface 31*b*.

The second prism 32 has a third transmitting surface 32*a* being approximately parallel to the second transmitting surface 31*d* of the first prism 31 and a fourth transmitting surface 32*b* intersecting an optical axis of an exit light from the second prism 32 approximately perpendicularly.

In this construction, a light from the object transmits through the first lens 11, the second lens 12, and the third lens 13, is incident to the roof reflection prism 22 and is reflected by the roof reflection surfaces 22*b* and 22*c*. Then, a real image of the object is formed in the vicinity of the first transmitting surface 31*a* of a first prism 31. Then, the light is incident to the first transmitting surface 31*a* of the first prism 31 and is reflected by the first reflection surface 31*b* and the second reflection surface 31*c*, and comes out from the second transmitting surface 31*d*. Then, an erected image is observed through the eyepiece 41 after transmitting through the third transmitting surface 32*a* and the fourth transmitting surface 32*b* of the second prism 32.

Furthermore, the materials used for the first prism 31 and those for the second prism 32 are the same one. Therefore, the refractive index and dispersion of the first prism 31 are the same as those of the second prism 32.

Various values of the third example are shown in Table 3. In Table 3, φ (unit: degree) denotes an angle between a plane 22*d* perpendicular to the optical axis 25 of the incident light to the roof reflection element 20 and the roof ridgeline 22*a*, and Ψ (unit: degree) denotes an angle between the optical axis 25 of the incident light to the roof reflection element 20 and the optical axis 26 of the exit light from the roof reflection element 20. Moreover, x1, y1, Sidenote a horizontal dimension, vertical dimension, and area of a projection of the first transmitting surface 31*a* onto a plane perpendicular to the optical axis including an intersection between the first transmitting surface 31*a* and the optical axis, respectively. Likewise, x4, y4, S4 denote a horizontal dimension, vertical dimension, and area of a projection of the fourth transmitting surface 32*b* onto a plane perpendicular to the optical axis of the light exit from the second prism 32 and including an intersection between the fourth transmitting surface 32*b* and the optical axis, respectively.

TABLE 3

| | |
|---|---|
| φ = 45° | |
| ψ = 90° | |
| x1 = 9 | |
| y1 = 6 | |
| S1 = x1 × y1 = 54 | |
| x4 = 12 | |
| y4 = 9 | |
| S4 = x4 × y4 = 108 | |
| S1/S4 = 54/108 = 0.5 | |

By using the aforementioned construction according to the example, it is obvious that a dimension of the real image viewfinder optical system including the image inverter optical system is small in the thickness direction, and a dimension to the object side of the eyepiece is small in the thickness direction.

Thus, a real image viewfinder optical system according to the present invention has a dimension of a whole real image viewfinder optical system including an image inverter optical system that is small in the thickness direction, and also a dimension of the image inverter optical system to an object side of an eyepiece lens system that is small in the thickness direction. Accordingly, a real image viewfinder optical system with high optical performance and compactness can be provided.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A real image viewfinder optical system comprising, in order from an object side:

an objective lens system having a positive refractive power as a whole; and an eyepiece lens system that observes a real image formed by the objective lens system and has a positive refractive power, wherein said real image viewfinder optical system has an image inverter optical system that erects the real image and that is arranged to an exit pupil side of a lens located to the most object side of the objective lens system and also to the object side of a lens located to the most exit pupil side of the eyepiece lens system;

wherein the image inverter optical system includes, in order from the object side along an optical axis of the real image viewfinder optical system:

a roof reflection element that reflects an incident light from the object side, a first prism having a first reflection surface that reflects an exit light from the roof reflection element to the object side, a second reflection surface that reflects an exit light from the first reflection surface to the exit pupil side, a first transmitting surface that intersects the optical axis of the exit light from the roof reflection element approximately perpendicularly, and a second transmitting surface that transmits an exit light from the second reflection surface and that is in a common plane with the first reflection surface, a second prism having a third transmitting surface and a fourth transmitting surface along an optical axis of an exit light from the first prism, the third transmitting surface being approximately parallel to the first reflection surface, and the fourth transmitting surface intersecting an optical axis of an exit light from the second prism approximately perpendicularly;

wherein the real image is formed between the roof reflection element and the first prism by the objective lens system;

wherein a surface having a refractive power is disposed between said roof reflection element and said first reflection surface, wherein the following conditional expression (1) is satisfied:

$$45° \leq \theta < 50° \qquad (1)$$

where θ denotes an angle (unit: degree) between an optical axis of the incident light to the roof reflection element and a roof ridgeline of the roof reflection element, and wherein, in order to reduce ghost images, the image inverter optical system is constructed so that the following conditional expression (2) is satisfied:

$$S1/S4 < 1 \qquad (2)$$

where S1 denotes a projected area of the first transmitting surface onto a plane perpendicular to an optical axis of the incident light to the first prism and including an intersection of the first transmitting surface and the optical axis, and S4 denotes a projected area of the fourth transmitting surface onto a plane perpendicular to the optical axis of the exit light from the second prism and including an intersection of the fourth transmitting surface and the optical axis.

2. The real image viewfinder optical system according to claim 1, wherein light incident on the second prism from the first prism passes directly through the second prism without reflection.

3. A real image viewfinder optical system comprising, in order from an object side:

an objective lens system having a positive refractive power as a whole;

an eyepiece lens system that observes a real image formed by the objective lens system and has a positive refractive power, wherein said real image viewfinder optical system has an image inverter optical system that erects the real image and that is arranged to an exit pupil side of a lens located to the most object side of the objective lens system and also to the object side of a lens located to the most exit pupil side of the eyepiece lens system;

wherein the image inverter optical system includes, in order from the object side along an optical axis of the real image viewfinder optical system:

a roof reflection element that reflects an incident light from the object side, an optical axis of the incident light to the roof reflection element making a skew relation to a roof ridgeline of the roof reflection element, a first prism having a first reflection surface that reflects an exit light from the roof reflection element to the object side, a second reflection surface that reflects an exit light from the first reflection surface to the exit pupil side, a first transmitting surface that intersects the optical axis of the exit light from the roof reflection element approximately perpendicularly, and a second transmitting surface that transmits an exit light from the second reflection surface and that is in a common plane with the first reflection surface, a second prism having a third transmitting surface and a fourth transmitting surface along an optical axis of an exit light from the first prism, the third transmitting surface being approximately parallel to the first reflection surface, and the fourth transmitting surface intersecting an optical axis of an exit light from the second prism approximately perpendicularly;

wherein the real image is formed between the roof reflection element and the first prism by the objective lens system;

wherein a surface having a refractive power is disposed between said roof reflection element and said first reflection surface;

wherein the following conditional expression (3) is satisfied:

$$40° < \Phi \leq 45° \tag{3}$$

where $\Phi$ denotes an angle (unit: degree) between a plane perpendicular to the optical axis of the incident light to the roof reflection element and the roof ridgeline of the roof reflection element, and wherein, in order to reduce ghost images, the image inverter optical system is constructed so that the following conditional expression (4) is satisfied:

$$S1/S4 < 1 \tag{4}$$

where S1 denotes a projected area of the first transmitting surface onto a plane perpendicular to an optical axis of the incident light to the first prism and including an intersection of the first transmitting surface and the optical axis, and S4 denotes a projected area of the fourth transmitting surface onto a plane perpendicular to the optical axis of the exit light from the second prism and including an intersection of the fourth transmitting surface and the optical axis.

4. The real image viewfinder optical system according to claim 3, wherein light incident on the second prism from the first prism passes directly through the second prism without reflection.

* * * * *